United States Patent Office 3,049,361
Patented Aug. 14, 1962

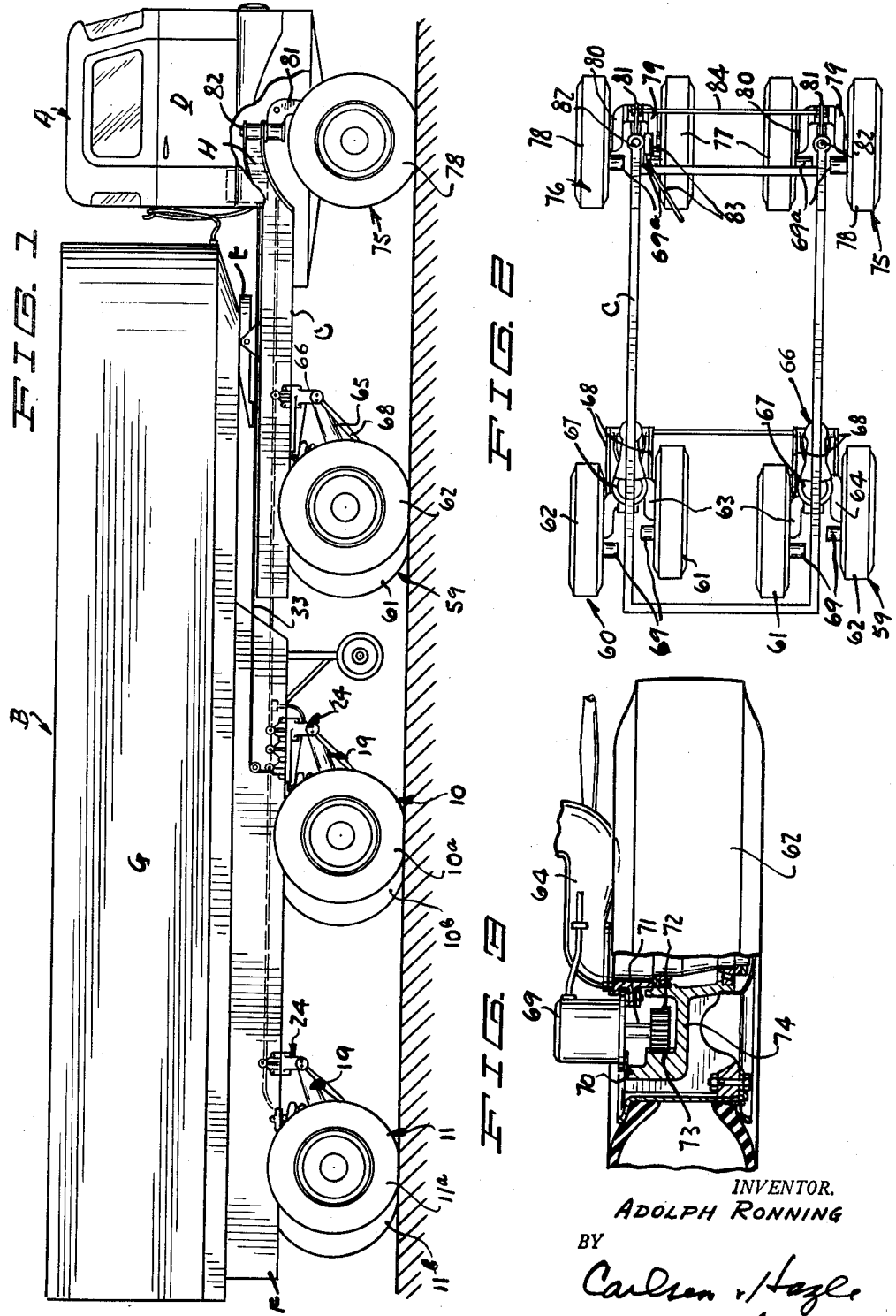

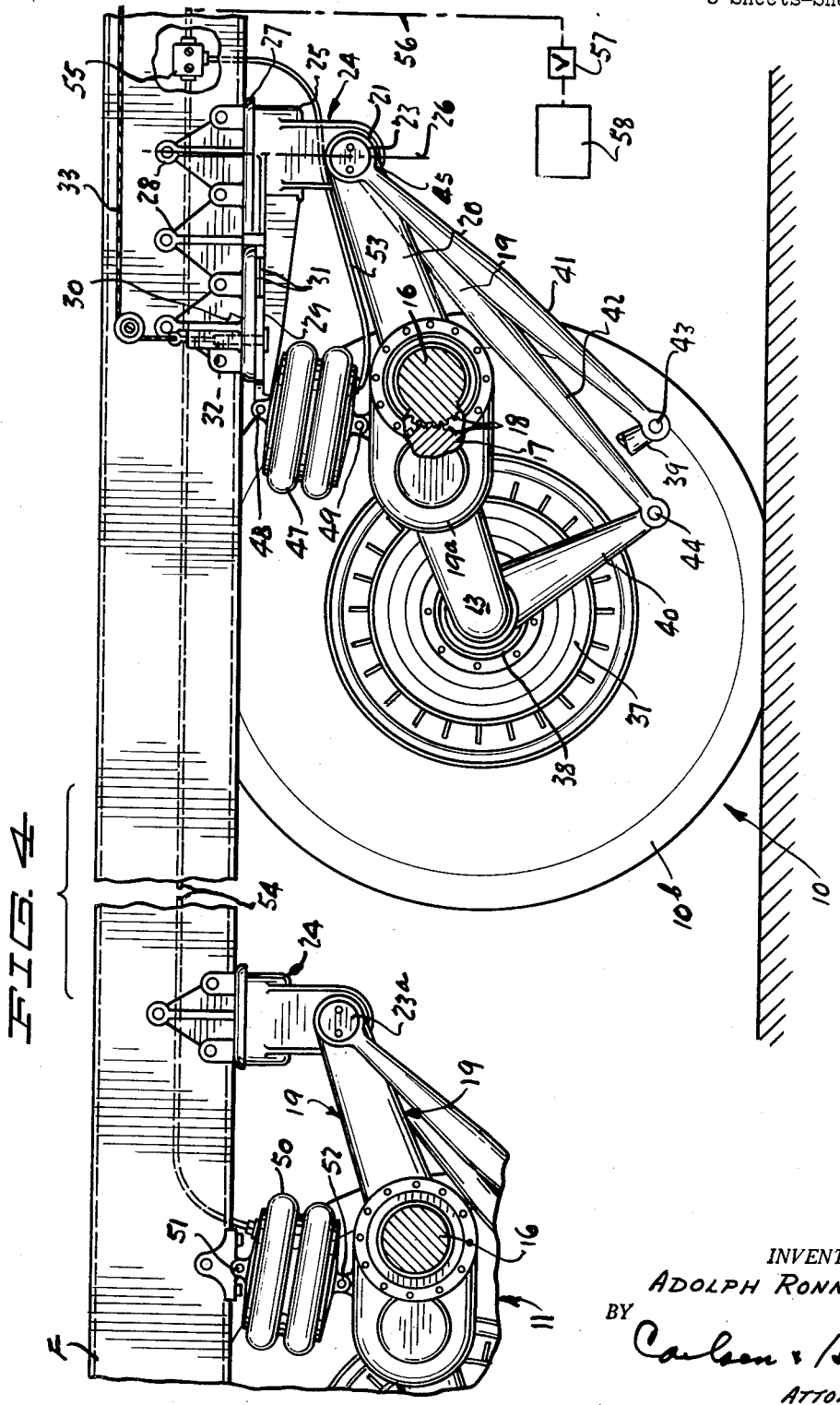

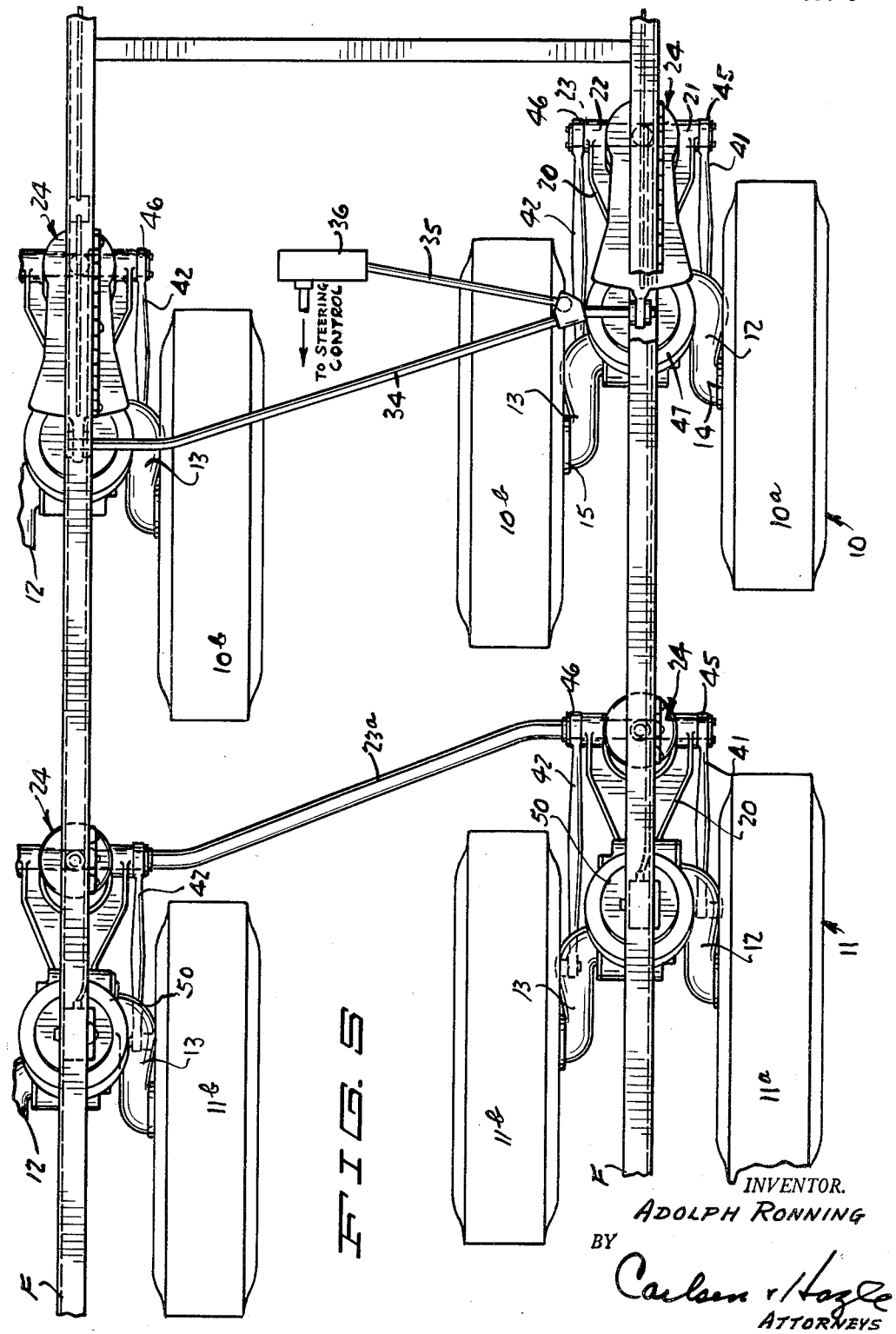

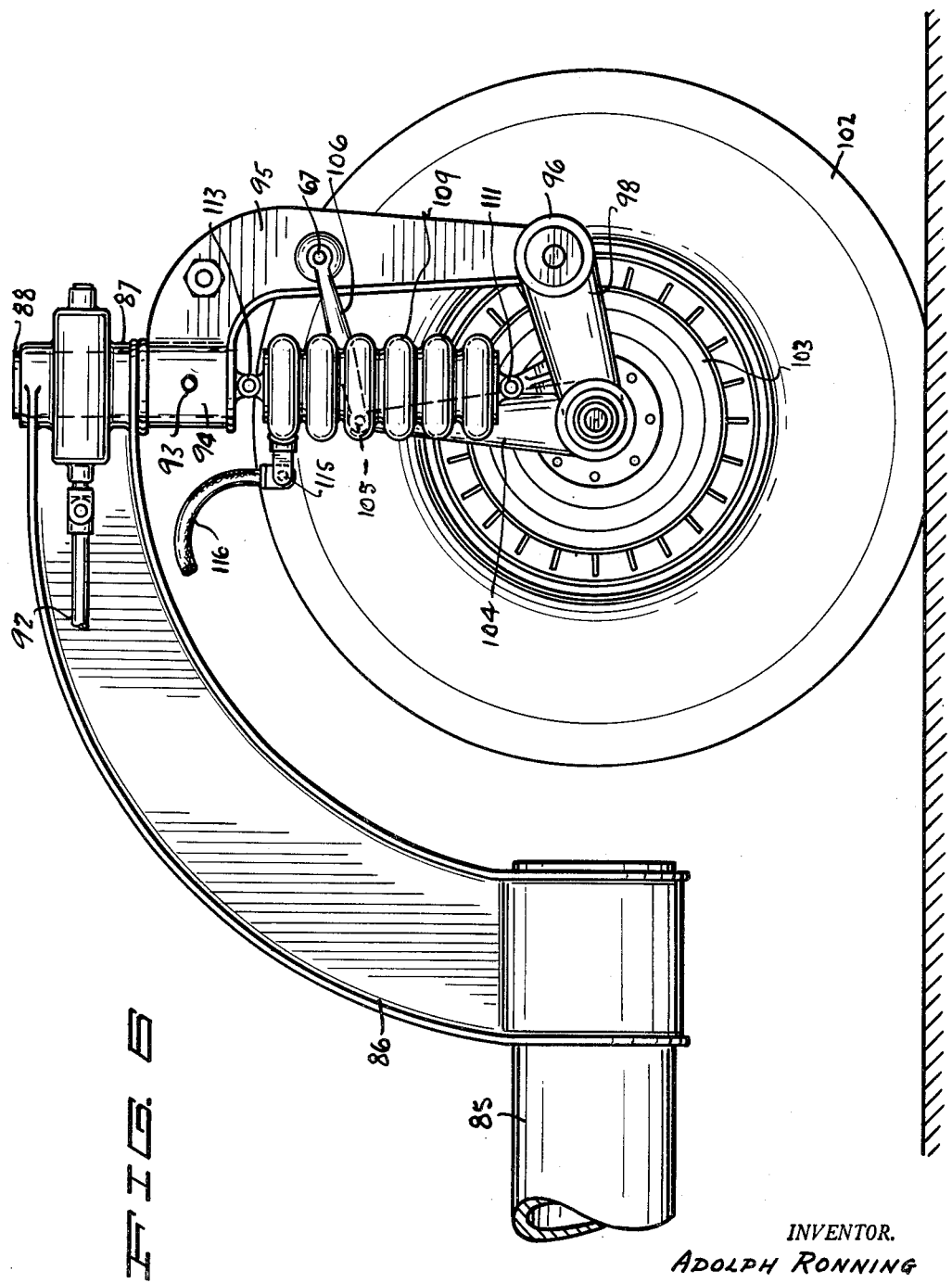

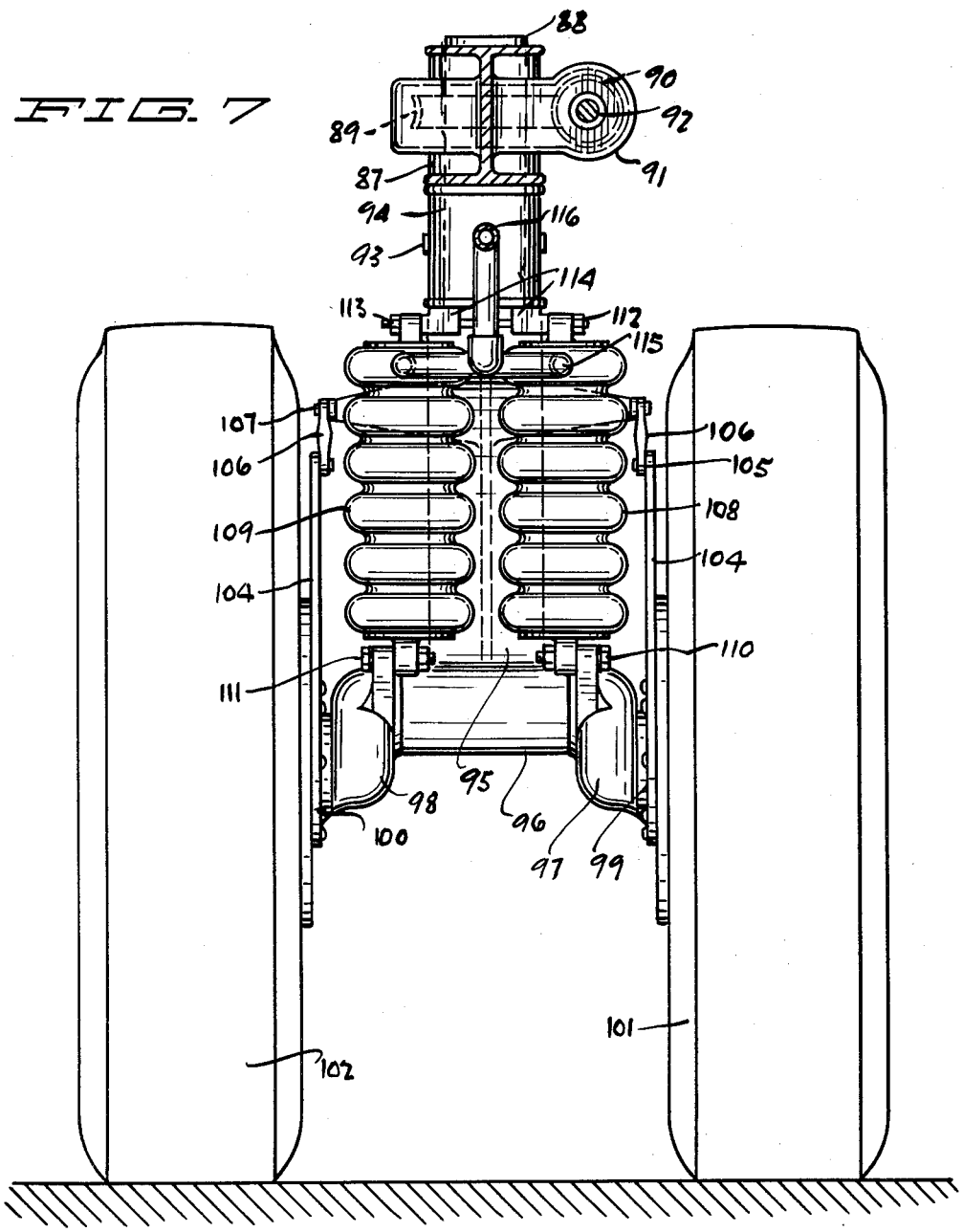

3,049,361
MULTI-COMPENSATING WHEEL SUSPENSION
Adolph Ronning, 4826 E. Weldon Ave., Phoenix, Ariz.
Filed Aug. 22, 1958, Ser. No. 756,696
11 Claims. (Cl. 280—124)

My present invention relates generally to improvements in wheel suspensions for all types of land and air vehicles, such as trucks, buses, tractors and other automotive vehicles, aircraft, and others.

As the weights and speeds of such vehicles rise in accordance with modern practices, it becomes increasingly important to provide modern wheel suspensions which will properly support the vehicles and distribute the loads over the surfaces being traveled to therefore reduce, or as far as possible eliminate the damage to highways, landing strips, etc. In addition the modern demand for comfort requires adequate springing of the loads as well as control over the level and height of the vehicle under widely varying load and road surface conditions. Without in the least implying any limitation as to the field of use of my invention I will herein show and describe its principles in detail in association with a modern over the road high speed and heavy duty vehicle of the kind commonly known as a semi-trailer, this choice being made because the problems inherent in the operation of large numbers of such vehicles are particularly important in view of our presently deteriorating and overcrowded highway system and the mammoth federal and state programs just now beginning to add new roadways and improve others.

In the effort to provide adequate load support as necessary to economically carry the continually increasing loads at continually increasing speeds, the trucking industry has widely adopted the tractor-trailer type of machine with dual wheels and with these duals in one way or another arranged in tandem at the rear of the trailer. The sight of such monstrous, multi-wheeled vehicles is a common one and their damage to our highways is becoming apparent not only to highway engineers but to the ordinarily observant driver. Placing dual wheels on a common or stiff axle solves no problem except under the most ideal conditions, which are seldom met, and anyone following a truck such as just described has observed the momentary flicker of light beneath one and then another of the dual wheels as they lose road surface contact momentarily and the entire load shifts to the companion wheels which may for the instant be passing over even a very slight rise or upward inequality in the road surface. Furthermore, the distance transversely between wheels is limited in such a truck resulting in lateral instability particularly on turns. The pounding effect of such suspensions on the road surface can be both seen and felt and its results in damage to the road surface requires continual repair and replacement thereof at enormous expense.

Increasing the road surface area over which the load is distributed is a basically sound idea if, and only if, equal load distribution to the close spaced wheels may be maintained at all times, something which cannot be done where the wheels are mounted on a common, stiff axle. As early as indicated by issuance of my Patent No. 2,208,601 I recognized this problem and solved it, for dual wheels, by arranging for the interdependent, differential upward and downward movements of the axes of rotation of the wheels with respect to the vehicle so that at all times the load distribution was not only equal but the vertical movement of the vehicle as the wheels traveled irregular surfaces was materially reduced. In this and many of my related patents cranked axles journal the wheels and are differentially connected in one way or another with provision made to transfer the load to the wheels without interfering with the differential upward and downward movements of the wheels and their individual axles. Furthermore, recognizing the problems inherent in prior tandem dual wheel suspensions as set forth above I solved these problems by the means shown and claimed in my Patent No. 2,612,387. Here for each side of the vehicle I provided a pair of the individually differentially compensating dual wheels, each with a swinging support connected to the vehicle and with said front and rear supports operatively connected by a spring or other device having a load transmitting, walking beam action for front to rear differential compensating action as well. Steerable dual wheels are shown in my Patent No. 2,700,550, selectively casterable or self-steering of a portion of the wheels in a tandem suspension in my Patents Nos. 2,698,759 and 2,842,377, the lifting of the wheels on curves and for other purposes in my Patent No. 2,698,758 and the application of brake torque reactors to various types of such wheel assemblies is found in my Patent No. 2,812,953. The foregoing represent only a small number of the patents granted me on various wheel suspensions but are cited as a background against which the present invention, its advantages and objects may be properly appraised.

Very recently two additional practices have come to be used in the automotive vehicle field, the first of these being the use of so-called air spring suspensions utilizing inflated bellows to yieldably support the vehicle on the wheels as well as adjust the level of the vehicle according to load, and the second being the use of individual motors mounted at or in the hubs of the wheels and applying torque for driving the wheels, such motors being fluid or electrically operated and solving many of the problems heretofore present in transmitting driving torque from a single large engine, through the necessary clutches, transmissions, shafting and differential gearing to the traction wheels.

Having in mind the foregoing it is the primary object of my present invention to apply the principles of air or fluid spring suspensions to differentially compensating dual wheels, whether to merely transfer load forces to the wheels or to provide the differentiating upward and downward motions to the respective wheels so necessary to constant equalization of the load distribution, as well as to provide the walking beam action as between tandem arranged pairs of the wheels. In the latter connection and as a further object of my invention I utilize the displacement of a fluid such as air by vertical deflection of one set of tandem wheels to move the other set in the proper upward or downward direction, thus eliminating mechanical spring or linkage connections between front and rear wheel pairs, making it possible to increase the space between the tandem wheel pairs and thus better distribute the load over the roadway surface with a consequent reduction in stresses and strains thereon as the vehicle travels. Another object is to provide air spring suspension adaptable for steerable or casterable dual wheels, with or without the brake torque reactors of my prior patent previously identified, which is extremely versatile as to the number of wheels used and which may further be arranged to raise and lower the vehicle frame as the loading thereof varies, or in order to tilt the frame as the vehicle rounds a curve and thereby make turns at higher speeds both possible and safe. In addition the effective spring resiliency may be adjusted according to the weight of the load for the safest and most comfortable ride. Still another object is to provide power drive units for the differentially compensated wheels in any number and in any arrangement which may be most desirable, even for the wheels of the tractor or pulling unit or for the trailing unit if this be desired. Other and related objects and advantages of my invention will be made apparent in the course of the following specification, reference being had therein to the accompanying drawings, in which—

FIG. 1 is a side elevation of a vehicle of the type known as the tractor and semi-trailer transport now so widely used and illustrating wheel suspension units according to my invention for both the tractor and the trailer units.

FIG. 2 is a top plan view of the chassis frame alone of the tractor unit of FIG. 1 and also illustrating the manner in which the wheel suspensions are associated therewith.

FIG. 3 is an enlarged fragmentary plan view partially in diametrical section of one wheel only of one of the wheel suspension units and showing the application thereto of an individual drive motor for applying propulsion torque to the wheel.

FIG. 4 is an enlarged fragmentary side elevation of one of the tandem wheel suspensions for the trailer unit of FIG. 1 and a portion only of the other suspension unit located therebehind, in both instances indicating the near wheels as removed and with certain parts shown broken away and in section.

FIG. 5 is a top plan view of a wheel suspension system suitable for the trailer of FIG. 1, only the inner portions of the wheel suspension units at the right hand side of the vehicle, looking forwardly, being here shown.

FIG. 6 is an enlarged side elevation of a steerable wheel suspension assembly according to my present invention with the near wheel removed and its journal shown in cross section.

FIG. 7 is a vertical sectional view looking forwardly through the gooseneck frame of FIG. 6 and looking at the wheel suspension unit in rear elevation.

Referring now more particularly and by reference characters to the drawing, A designates generally the tractor drawn semi-trailer vehicle of the type chosen to illustrate my invention, although the wheel suspension principles herein shown and claimed are not, of course, limited to this use only as will be understood. The tractor A has a chassis frame C, a cab D and releasable fifth wheel connection E to the trailer B, which trailer has a chassis frame F and cargo body G. Aside from the fact that the frames C and F are generally rectangular in shape as viewed from above, it is not necessary to describe them in detail although it will be understood that each has longitudinal side channels or sills and that in this particular instance these parts of the tractor frame C are upwardly-forwardly goosenecked at H for a purpose presently to appear.

For each side of the trailer B, I provide tandem arranged front and rear wheel suspension sets 10 and 11 each made up of a pair of close spaced wheels 10$^a$—10$^b$ and 11$^a$—11$^b$ located respectively outside and inside the adjacent side channel of the frame F. Said wheels are, of course, provided with the usual pneumatic tires and a corresponding pair of tandem wheel sets are provided for the other side of the trailer as is fragmentarily indicated in FIG. 5. Since these wheel sets are all duplicates a description of the details of one will suffice for all. With particular reference then to the front wheel set 10 the same comprises cranked axles 12 and 13, one for each wheel 10$^a$—10$^b$, with said axles having at rear ends outwardly turned journals at 14 and 15 for rotatably mounting the associated wheels. At the forward ends the axles have oppositely turned parallel pintles or trunnions 16—17 (FIG. 4) arranged in parallel forwardly-rearwardly overlapping relationship and provided with meshing teeth 18. Said pintles are journaled in the rear end 19$^a$ of a housing or mounting member 19 having a forward end 20 which angles upwardly toward and terminates beneath the adjacent side of the frame F and forked and transversely bored to provide bearings 21—22 pivoted upon a cross pin 23 carried by a bracket structure designated generally at 24 secured to the frame F. As thus far described the structure is essentially that of my Patent No. 2,612,387 and as explained in detail therein but readily understood from the disclosure here the entire wheel set 10 may move upwardly and downwardly with respect to each other as the cranked axles 12 and 13 swing in opposite directions about the axes of their pintles 16—17, the opposite motion of these axles being brought about by the meshing gear teeth 18. As set forth in my Patent No. 2,208,601 and related patents on steerable dual wheels there are many ways in which this differentiation in the wheel action may be accomplished and I do not herein limit myself to the geared together relationship of the wheel axles shown. Required, of course, is some means for transmitting load forces from the frame F to the member 19 and a number are shown in my earlier patents but in accordance with this invention a particular device for the purpose is shown and will be presently described.

The bracket structure 24 is similar to that shown in my Patent No. 2,842,377 (and in Patent No. 2,764,421 referred to therein) in that it is not a one piece rigid structure but includes a lower section 25 carrying the pin 23 pivoted about an upright axis designated at 26 in FIG. 4 to an upper section 27 which is secured by riveted or bolted flanges 28 to the frame F. Extending from said lower bracket section 25 is a rearwardly directed segment shaped bearing flange 29 beneath an upper support flange 30 on the upper bracket section 27 and the facing surfaces of these flanges 29—30 have relatively narrow bearing ribs 31 by which the load between these flanges is transmitted, with a minimum of friction, as the lower bearing section and the wheel set carried thereby steers or casters about the axis 26. A suitable latch pin 32 (FIG. 4) may be arranged to penetrate the rear ends of the flanges 29—30 to prevent such motion about the axis 26 and controlled by a cable 33 from the cab D so that the operator of the vehicle may exercise control over the caster action of the two front wheel sets of the trailer B or as seen in FIG. 5 the rear ends of the lower flanges 29 may be connected by a cross rod 34 to swing in unison and a radius or steering rod connection 35 then made to a steering gear 36, power operated if desired, by which these wheel sets may be actually steered if so desired. Such steering may be tied in with the steering of the tractor A, controlled by the angle assumed between the trailer and tractor as motion occurs about the axis of the fifth wheel E or otherwise controlled in any suitable manner.

As discussed in detail in my Patent No. 2,812,953 each of the wheels 10$^a$—10$^b$ includes a brake structure a part of which is a backing plate 37 (FIG. 4) carrying the brake shoes (not shown) and which backing plate tends to rotate with the associated wheel when the brakes are applied. These backing plates 37 are journaled for limited rotation at 38 on the axle journals 14—15 and crank arms 39—40 extend angularly from the plates, in this case downwardly and forwardly. Links 41—42 are then pivoted at 43—44 to said crank arms, extend upwardly and forwardly therefrom and are pivoted at 45—46 on the extremities of the cross pins 23 so that the brake torque set up as the brakes are applied is transmitted through the links and through the brackets 24 directly to the frame F, removing any tendency for this force to interfere with the equalizing motions of the cranked axles 12—13 or increase wear thereon. At the same time the pivoted swinging arrangement of the links 41—42 will in no way interfere with the action of the cranked axles or of the members 19.

The rear wheel set 11 at each side of the trailer is similar to the corresponding front wheel set with corresponding parts such as the axles, etc., given the same reference numerals and in FIGS. 1, 4 and 5 differ only in that the bracket structure 24 mounting each rear wheel set to the frame does not have the pivoted upper and lower parts as will be clear. This makes possible (FIG.

5) the substitution for the cross pins 23 on which the front wheel sets pivot from the frame F of a one piece cross pin 23ª for added transverse rigidity where the wheel sets do not caster or steer. In FIG. 5 it will be noted that the wheel pattern is like that shown in some of my earlier patents (notably No. 2,706,121) with the wheels all offset in forward and rearward directions requiring that cross pin 23 be bent at its extremities. The advantages of this wheel pattern have been set forth in such detail heretofore as to require no explanation herein.

Connected between the rear end portion 19ª of each mounting or housing member 19 of the front wheel sets 10 and the rear end of the flange 29 is a bellows or other variable length fluid containing element 47, having upper and lower pivot connections 48—49 to the flange and member. Likewise for each rear wheel set 11 a similar bellows or element 50 is pivoted at 51 to the frame F and at 52 and to the rear end portion of the member 19. Flexible tubes or conduits 53—54 connect the bellows 47—50 at each side of the trailer to a valve 55 from which another tube or conduit 56 leads to a main control valve 57 and to a suitable source 58 of fluid under pressure, preferably compressed air indicated at 58 in FIG. 4, both valve 57 and supply source 58 being diagrammatically shown. The valve 55 may be remotely controlled or pressure responsive but in either case normally provides communication between the two bellows 47 and 50 through the tubes 53—54. These bellows are of the type now coming into use as air suspension means to take the place of springs and are longitudinally yieldably compressible as to length in order to spring the load of the frame F and its load upon the wheel suspension. In addition when so connected the displacement of air from the front bellows 47 as the associated wheels meet an obstruction in the road is communicated to the bellows 50 to equalize the load between front and rear suspensions, equivalent to the walking beam action of my earlier patents such as No. 2,612,387. Because there are no length limitations as is the case of the walking beam type of front to rear suspension connections, however, the wheel sets 10—11 may be spaced further apart and in fact at the same spacing as the traction and steering wheels of the tractor A (note FIG. 1) and the load distribution over the road surface is more evenly and widely dispersed (front to rear that is) with a resulting advantage to the highway surface and reduction in the wear thereon under heavy load, high speed operating conditions. Furthermore by controlling valve 57 more fluid or air may be added to the overall content of the bellows 47—50 to raise the frame F or vice versa whichever and wherever appropriate, or to vary the springing under loads of differing weights. In addition the volume of fluid or air in the bellows upon opposite sides of the frame may be varied to tilt the frame, as in rounding a curve, and thereby permit safe, higher speed operation under these conditions.

For the tractor A in the vehicle shown herein a pair of rear wheel sets 59—60 very similar to those just described is provided, each having an inner and outer wheel 61—62 carried by cranked axles 63—64 journaled and differentially connected together in the rear ends of housing or mounting members one of which appears at 65 extending upwardly and forwardly and pivoted at forward ends to brackets 66 secured to the sides of the frame C. Air spring bellows 67 are connected between the frames and the members which carry the wheel sets to carry and spring the load as aforesaid. Torque reactor linkage is also provided for each wheel as just described, only the links 68 appearing herein.

Inasmuch as the wheels 61—62 thus will have an interdependent upward and downward relative movement when so mounted the required torque for propulsion and traction is provided by fitting each wheel with its individual drive motor designated generally at 69 in FIGS. 2 and 3. Whether these motors are electrical, fluid operated or otherwise they are mounted on the backing plates one of which appears at 70 in FIG. 3 with their output shafts 71 extending through said plates and fitted with drive pinions 72 meshing with ring rear teeth 73 formed upon a circular part of the hub structure 74 of the wheel. Thus the motor will drive the wheel either forwardly or rearwardly at the will of and under control of the operator of the vehicle and the driving torque reaction, like the brake torque, is taken care of by the same linkage including the links 68. This individual drive for the wheels has been demonstrated to be quite effective and it is so versatile that it may be applied to any or all of the wheels of a vehicle whether steerable or not, according to the results desired.

At its front end the tractor A of FIGS. 1 and 2 is shown as provided with wheel sets 75—76 each including an inner and outer, differentially connected pair of wheels 77—78 carried by cranked axles 79—80 attached to the lower ends of steerable members 81 the upper ends of which are turned rearwardly beneath the goosenecks H and pivoted thereto on generally upright steering axes by pins 82. A steering gear and shaft mechanism 83 is connected to swing one of said members 81 and both are connected by a cross rod 84 to steer all of the front wheels in unison. Each steerable wheel 77—78 may, if desired, be provided with its individual drive motor as aforesaid and so indicated throughout at 69ª to provide traction at the front of the vehicle. Preferably these front steerable wheel sets are like the one set shown in FIGS. 6 and 7 in more detail, although this structure may find uses other than in the tractor-trailer combination just described. For this reason the parts will be described in more detail and given their own reference characters.

Thus in FIGS. 6 and 7 there is shown a frame member 85 having an upwardly and forwardly arched gooseneck attachment 86 terminating in a bearing 87 for an upright pin 88 to which is secured a worm gear 89 driven by a steering worm 90 in a surrounding housing 91 as seen in FIG. 7. A steering shaft 92 is connected to rotate the worm gear 89 and thus turn the pin 88 about the upright steering axis. Secured at 93 to the lower end of the pin 88 to turn therewith is the upper end 94 of a wheel carrier or member 95, like that indicated at 81 heretofore, and from this pin the member 95 extends first forwardly and then downwardly in an inverted L-shape as clearly seen in FIG. 6. At its lower end the member 95 has a transversely elongated bearing 96 in which are journaled the coaxial front ends of cranked axles 97—98 which extend rearwardly and are provided at rear ends with outwardly turned journals 99—100 upon which are rotatably mounted the wheels 101—102. Here again each wheel 101—102 has a brake system including a backing plate 103 mounted for limited rotation by brake torque reaction upon the journal of the associated cranked axles 97 or 98 and secured to each backing plate is a lever 104. Here the levers 104 extend upwardly and at upper ends are pivoted at 105 to the rear ends of links 106 extending forwardly alongside the member 95 and pivoted at 107 thereto. Thus the forces developed by brake torque reaction (and by application of propulsion torque to the wheel by motors such as 69—69ª as aforesaid) are transmitted directly to the member 95 and thence to the vehicle frame without interfering with movements of the axles 97—98, particularly since the links 106 parallel these axles and thus act as a parallel motion linkage in association therewith.

By contrast with the structures of FIGS. 4 and 5 the cranked axles 97 and 98 are not geared together for differential, equalizing upward and downward movements with respect to the vehicle frame. Instead the axles are connected to the frame, and the load is transmitted from frame to wheels, by a pair of bellows or similar variable length containers 108—109 arranged side by side between the wheels 101—102 as best seen in FIG. 7. At lower ends these bellows 108—109 are pivotally attached at 110—111 to the rear end portions of the axles 97—98 and at upper ends they are pivoted at 112—113 to the lower side of the upper end 94 of member 95 for which purpose suitable mounting lugs 114 (FIG. 7) are provided. A cross tube or conduit connection 115 joins the upper ends of the bellows 108—109 so that if either wheel 101—102 is moved upward with its associated swinging axle the resulting compression and reduction of length of the associated bellows will enable the other bellows to elongate and the wheel to move downward thus equalizing the load distribution between the wheels with a differentiating action like that described hereinbefore and in my prior patents. For adjusting the overall fluid content of the two bellows 108—109 a supply tube or conduit 116 is connected to the tube 115 and may lead to a control valve and supply source such as indicated respectively at 57 and 58 in FIG. 4, thus to adjust the springing according to varying loads or to raise and lower the frame of the vehicle as may be desired or required.

It will be obvious from the foregoing that I have provided a wheel suspension herein which is extremely versatile in its application to various types and kinds of vehicles and to various locations on each vehicle, providing equalization of the load to all wheels, air or fluid spring suspension, vertical adjustment of the wheels, adjustment of the spring rate for various loads, casterable or steerable mounting of the wheels according to need and individual propulsion torque to any or all of the vehicle according to the characteristics and power required. In the case of the large tractor and semi-trailer vehicle of FIG. 1 it will also be noted that the front to rear spacing of all the wheel sets 10, 11, 59 and 75 is equal for greatest dispersion of the load over the maximum road surface as necessary to reduce damage to the same regardless of the loads and speeds of those vehicles, which are constantly increasing as the vehicles are improved and modern highways come into use.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. A wheel suspension for a vehicle of the tractor and semi-trailer type having connected frames, comprising for each side of each frame a pair of generally forwardly and rearwardly extending tandem members operatively mounted to the associated frame, a pair of cranked axles arranged with the axles of each pair on opposite sides of each said member and journaled on transverse axes at their forward ends upon the members, ground wheels supporting the rear ends of the axles, means connecting the axles of each member for differential upward and downward movements at their wheel supported ends relative to the frame, at least one air spring bellows operatively connected between each member and the frame for yieldably resisting said upward movements of the axles and wheels, the forwardmost wheels of the tractor being mounted for steering movements, at least one pair of wheels at each side of the trailer unit being casterably mounted upon separate vertical axes above each such pair of wheels, and means for supplying propulsion torque to wheels of the tractor unit.

2. In a wheel suspension for a vehicle of the tractor and semi-trailer type, the tractor and trailer each having a frame and the frames being pivotally connected together, an assembly for each side of each frame comprising a pair of generally forwardly and rearwardly extending tandem arranged members and means for operatively mounting each member to the associated frame, a pair of cranked axles for each said member and journaled on transverse axes at their forward ends upon the members, ground wheels supporting the rear ends of the axles, means connecting the axles at each member for differential upward and downward movements at their rear wheel supported ends relative to the frame, at least one air spring bellows operatively connected between each member and the frame for yieldably resisting said upward movements of said axles and wheels, the forwardmost wheels of the tractor being mounted for steering movements, and the members of the remaining wheel pairs being pivoted on the associated frames for upward and downward movements, the forwardmost pairs of wheels on the trailer unit being casterably mounted upon separate vertical axes above each such pair of wheels, means for supplying propulsion torque to wheels of the tractor unit at least, and means for adjusting the air supply in the bellows to raise and lower the frames relative to the wheels as well as to vary the springing according to the weight of the load upon the wheels.

3. A wheel suspension for a vehicle of the tractor and semi-trailer type, the tractor and trailer each having a frame and said frames being pivotally connected together, comprising for each side of each frame a pair of generally forwardly and rearwardly extending tandem members and means for operatively mounting each member on the associated frame, a pair of cranked axles for each said member and journaled on transverse axes at their forward ends of the axles, means connecting the axles at each member for differential upward and downward movements at their rear wheel supported ends relative to the frame, at least one fluid filled adjustable length and operatively interconnected bellows operatively connected between each member and the frame for yieldably resisting said upward movements of said members and wheels, the forwardmost wheels of the tractor being mounted for steering movements, means for supplying propulsion torque to wheels of the tractor unit at least, and there being at least four pairs of the wheels at each side of the frames and all substantially forwardly and rearwardly evenly spaced one pair from each other pair to equally and widely distribute the load of the vehicle over the road surface it travels.

4. In a vehicle suspension of the character described for supporting the frame of the vehicle, a pair of wheels and cranked axles supported by said wheels and extending forwardly therefrom, means differentially connecting the forward ends of the axles for equalizing up and down motions at their wheel carried ends, and a member having a pivot connection to the vehicle frame and operatively connecting the differentially connected ends of said axles to the frame; brake mechanism for each of the wheels comprising a brake part rotatable with the wheel and a cooperating brake part mounted upon the axle, bearing means journaling the latter brake part for limited rotation with the wheel connected brake part as a result of brake torque reaction, torque links connected to the journaled brake parts and extending therefrom and operatively connected to transmit torque forces from the journaled brake part to the frame, a motor on said journaled brake part, and gearing connecting the motor to transmit propulsion torque to the wheel.

5. A wheel suspension for a vehicle frame, comprising in combination, a pair of wheels and a pair of axles having journals at their rear ends for the respective wheels, differential mechanism swingably connecting the axles for differential up and down movements at their rear ends, a member supportably connecting the said differential mechanism to the frame, a separate drive motor operatively associated with each individual wheel for imparting propulsion torque thereto, and mechanism operative for bypassing the effects of reaction of said propulsion torque past the differential mechanism to the frame.

6. A wheel suspension for a vehicle frame, comprising in combination, a pair of wheels and a pair of axles having journals at their rear ends for the respective wheels, differential mechanism swingably connecting the axles for differential up and down movements at their rear ends, a member supportably connecting the said differential mechanism to the frame, a separate drive motor operatively associated with each individual wheel for imparting propulsion torque thereto, and link elements operatively connected from each wheel to the frame and operative to transmit reaction of said propulsion torque directly to said frame.

7. In a vehicle suspension of the character described and for supporting the frame of the vehicle, the combination comprising a pair of wheels and cranked axles supported by said wheels and extending forwardly therefrom, means differentially connecting the forward ends of the axles for equalizing up and down motions at their wheel carried ends, and a member having a pivot connection to the vehicle frame and operatively connecting the differentially connected ends of said axles to the frame; the improvement which comprises brake mechanism for each of the wheels each comprising a brake part rotatable with the wheel and a cooperating brake part mounted upon the axle, bearing means journaling the latter brake part for limited rotation with the wheel connected brake part as a result of brake torque reaction, a separate motor on each said journaled brake part and operative to transmit propulsion torque to the associated wheel, and means connecting said journaled brake parts to the frame for transmitting reaction of both brake and propulsion torque to the frame independently of said differentially connected axles.

8. In a wheel suspension assembly of the character described for supporting the generally rectangular frame of a vehicle, the combination comprising a pair of wheels, cranked axles supported by said wheels and extending forwardly therefrom, one such assembly being located adjacent both of the front corners and both of rear corners of said frame, means differentially connecting the forward ends of said cranks for equalizing up and down motions at their wheel carried ends, a first pair of brackets for the front wheels one such bracket being pivotally mounted on said frame above each of said front wheels for movement about a vertical axis, a second pair of brackets each connected to the frame above each of the rear wheels, a fore and aft member having a transverse pivot connection at the forward end thereof to each such bracket and supporting at the rearward end thereof the differentially connected ends of each pair of axles, said front wheels being steerable in unison about said vertical axes, air spring bellows pivotally connected between each of said first brackets and the rearward end of said members of the front wheels to spring the load of the vehicle on the wheels, cross connections between said bellows whereby they will differentially move the axles and thereby equalize the load supported by each of said bellows and a bellows connected between the frame and each of said members of the rear pairs of wheels.

9. A wheel suspension for a vehicle frame comprising, a pair of generally forwardly and rearwardly extending members, one member on each side of the frame, a bracket pivotally connected to the frame above each of the members for movement with respect to said frame about a vertical axis, said bracket including a transverse pivot member upon which the forward end of the associated member is pivoted for upward and downward movement at its rear end, said bracket also including a rearward extension positioned above the said member, cranked axles arranged along opposite sides of each member and journaled on transverse axes at their forward ends upon the rear portions of the members, ground wheels supporting the rear ends of the axles, means connecting the axles of each member for differential upward and downward movements at their rear ends relative to each other and a resilient extensible suspension member pivotally connected between said extension and the rearward end of said member for yieldably resisting said upward movement of said members.

10. The apparatus according to claim 9 wherein said resilient extensible suspension member comprises a fluid filled pressure responsive bellows.

11. The apparatus according to claim 10 wherein said vehicle includes at least two such wheel suspensions and wherein the fluid filled pressure responsive bellows of a pair of such suspensions are connected together by duct means, the fluid contained in said bellows communicating through said duct.

References Cited in the file of this patent
UNITED STATES PATENTS

| | | |
|---|---|---|
| 1,177,237 | Egan | Mar. 28, 1916 |
| 1,377,497 | Mattson | May 10, 1921 |
| 1,607,962 | Patitz | Nov. 23, 1926 |
| 2,208,601 | Ronning | July 23, 1940 |
| 2,517,359 | Shriver | Aug. 1, 1950 |
| 2,612,387 | Ronning | Sept. 30, 1952 |
| 2,638,357 | Larison | May 12, 1953 |
| 2,691,420 | Fox | Oct. 12, 1954 |
| 2,706,121 | Ronning | Apr. 12, 1955 |
| 2,717,787 | Ward | Sept. 13, 1955 |
| 2,733,771 | Sullivan | Feb. 7, 1956 |
| 2,764,421 | Ronning | Sept. 25, 1956 |
| 2,787,475 | Jackson | Apr. 2, 1957 |
| 2,812,953 | Ronning | Nov. 12, 1957 |
| 2,828,139 | Lautzenhiser | Mar. 25, 1958 |
| 2,842,377 | Ronning | July 8, 1958 |
| 2,848,248 | Hansen | Aug. 19, 1958 |
| 2,903,272 | Bordenkircher et al. | Sept. 8, 1959 |
| 2,907,576 | Hutchens | Oct. 6, 1959 |
| 2,917,318 | Nallinger | Dec. 15, 1959 |
| 2,920,903 | Locker | Jan. 12, 1960 |

FOREIGN PATENTS

| | | |
|---|---|---|
| 697,541 | Great Britain | Sept. 23, 1953 |